United States Patent Office 3,112,992

Patented Dec. 3, 1963

3,112,992

OXIDES OF TUNGSTEN AND GROUP III–A ELEMENTS

Tom Allen Bither, Jr., Wilmington, Del., assignor to E. I. du Pont de Nemours and Company, Wilmington, Del., a corporation of Delaware No Drawing. Filed June 30, 1959, Ser. No. 823,827
18 Claims. (Cl. 23—51)

This invention relates to certain new oxide compositions and to their preparation.

Thermoelectric materials and semiconductors are finding an increasing number of applications in devices for heating and refrigeration, in transistors, crystal rectifiers, electroluminophors, and the like. In spite of the undoubtedly important technical advances made in these fields, there is still need for better and lower cost thermoelectric materials and semiconductors. Ultrahigh pure silicon and germanium are used in semiconductor applications while complex heavy metal tellurides are employed in thermoelectric applications. However, they are all expensive, difficult to produce, and do not have the combination of properties desired for all recognized thermoelectric and semiconductor applications. There is accordingly need for new materials possessing better semiconductor properties and higher thermoelectric efficiency than are possessed by known compositions. The discovery of such products will lead to wider application of thermoelectric and semiconductor materials in new and unexplored fields.

According to this invention, thermoelectric and semiconductor materials which are useful for the interconversion of heat, light, and electrical energies are provided by certain oxides of tungsten and group III–A elements of atomic number 5 through 81.

The oxides of this invention correspond to $M_xWO_3$, wherein M is a group III–A element of atomic number 5 through 81, and $x$ is a number from about 0.05 to 0.5.

The compositions of this invention can be made by treating powdered tungstic acid and an oxide or tungstate of the group III–A element with powdered tungsten in supercritical water at a temperature of at least 450° C. and at a pressure of at least 500 atmospheres, preferably at least 1000 atmospheres. In general, this hydrothermal treatment is carried out with finely divided powders for a time sufficient to bring about the desired reaction. This usually takes between 2 and 20 hours, under pressures of 500 to 3500 atmospheres at temperatures of 450° to 800° C. In this method the group III–A element is used in an amount sufficient to provide a gram atom ratio thereof to total tungsten in the range of about 1:20 to 50:1.

An alternative procedure, which can be conveniently used when one of the reactants is sufficiently low melting to act as a flux, is to mix the reactants and fuse them under a blanket of an inert gas, e.g., argon, or in a sealed evacuated system under autogenous pressure. This treatment takes between 3 and 130 hours, depending upon the nature of the reactants. In this process tungsten trioxide is reduced with tungsten in a melt of a tungstate or an oxide of the group III–A element. The tungsten trioxide, tungsten, and tungstate or oxide of group III–A element are used in amounts sufficient to provide a gram atom ratio of group III–A element as oxide or tungstate to tungsten as free metal, oxide, or tungstate of 1:20 to 50:1. In this method, and in the supercritical water process the gram atom ratio of tungsten to tungsten oxide charged to the reactor is not critical. It may range from 1:40 to 5:1, and usually 1:32 to 3:1.

The pressure can be autogenous, as when evacuated, sealed reactors are used, and the temperature can be from 600° to 1100° C., preferably 850° to 1000° C.

Alternative convenient methods for preparing the oxides of this invention include:

(1) Direct reduction of tungsten trioxide with the group III–A metal under autogenous pressure for from 1 to 96 hours. This method is illustrated in Example VI.

(2) Reduction of tungsten trioxide with the vapor of a group III–A metal under autogenous pressure for from 1 to 96 hours. This method is illustrated by Example IX.

The examples which follow illustrate preferred embodiments and are not to be construed as limiting this invention.

The X-ray diffraction data given in the illustrative examples were obtained by the Debye-Scherrer powder method with a North American Phillips unit, using copper K α-radiation filtered through nickel to give an effective wave length of 1.542 A units. In this method the sample is finely ground and packed into a capillary tube, which is mounted in a camera having a 114.9 mm. diameter.

In the tabulations of diffraction data, "I" refers to the observed intensity values and "*d*" to the interplanar spacings expressed in Angstrom units (A.). The letter S designates the strongest line recorded, $M_1$, $M_2$, $M_3$, and $M_4$ are lines of medium intensity, the order of intensity decreasing with increasing numerical sequence, F means that the line is faint, and VF that it is very faint.

EXAMPLE I

A pelleted blend of 0.49 g. of tungsten powder, 2.17 g. of tungsten trioxide, and 10.0 g. of thallium tungstate was charged into a quartz tube and evacuated for several hours at 425° C. in order to remove any organic mold lubricant retained on the sample during pelleting. The tube was then further outgassed for several hours at 100° C. and sealed off under high vacuum. The sealed tube was then heated under autogenous pressure to 972° C. over a 2½ hour period in a muffle furnace. The charge was then slowly cooled to 710° C. over a 4½ hour period, at which point heating was terminated.

The resultant product consisted of a mass of dark blue needles of hexagonal cross section (size up to 1 x 2–3 mm.) embedded in a matrix of thallium tungstate. Extraction with boiling 1 N aqueous sodium hydroxide, followed by boiling water, freed these needles from the matrix. The X-ray diffraction pattern obtained on these needles is given in Table I.

*Table I*

| I | d | Miller Indices hkl |
|---|---|---|
| $M_3$ | 3.78 | 002 |
| S | 3.23 | 102 |
| S | 3.18 | 200 |
| $M_2$ | 2.64 | 112 |
| $M_3$ | 2.43 | 202 |
| F | 2.31 | 211 |
| $M_2$ | 2.03 | 212 |
| $M_3$ | 1.88 | 004 |
| $M_2$ | 1.85 | 220 |
| VF | 1.77 | 310 |
| F | 1.72 | 311 |
| $M_3$ | 1.66 | 222 |
| $M_2$ | 1.62 | 204 |
| $M_2$ | 1.60 | 312 |
| $M_3$ | 1.47 | 402 |
| F | 1.45 | 313 |
| $M_3$ | 1.365 | 322 |
| $M_3$ | 1.32 | 224 |
| F | 1.32 | 412 |
| $M_4$ | 1.23 | 106 |
| $M_3$ | 1.22 | 494, 413 |
| $M_3$ | 1.21 | 420 |

Laue patterns on a single crystal confirmed the above powder data and indicated an hexagonal crystal lattice, $a_0$=7.38 A., $c_0$=7.56 A., in the possible space groups $D_{6h}^3$, $C_{6v}^3$, or $D_{3h}^2$, with Laue symmetry 6/mmm. These needles analyzed 60.39% tungsten, indicating the composition $Tl_{0.35}WO_3$.

Electrical characterization of single crystals of the product $Tl_{0.35}WO_3$ showed it to have a room temperature resistivity of $1.4\times10^{-3}$ ohm cm. and a thermoelectric power of 15 microvolts/°C. (n-type).

EXAMPLE II

A pelleted blend of 0.49 g. of tungsten powder, 2.17 g. of tungsten trioxide, and 10.0 g. thallium tungstate was sealed off under high vacuum in a quartz tube tapered to a point at the lower end, as described in Example I. Thermal analysis on a separate blend of the above composition had indicated that a fluid melt was obtained at a temperature above 810° C. and that at 584° C. complete solidification occurred. The above sample was accordingly reacted by lowering it through a fixed thermal gradient as follows: (*a*) maintained one hour in the molten state in a zone of 817–850° C., (*b*) lowered at a rate of 1.5 inches/24 hours so that in five days all the sample was below the solidification temperature of 584° C.

The resultant product consisted of a mass of dark blue needles of hexagonal cross section (size up to 1 x 2–4 mm.) embedded in a matrix of thallium tungstate similar to the product of Example I. Extraction with boiling 1 N aqueous sodium hydroxide and then boiling water freed these needles from the matrix. These needles were observed to be resistant to the action of boiling nitric acid as well as aqua regia. A thallium analysis gave a value of 21.65%, indicating the composition $Tl_{0.31}WO_3$.

Electrical characterization of this material in powder form showed it to be electroluminescent. It was observed to have a yellow-green color of faint intensity that appeared at a threshold voltage of 500 volts. In contrast, the known $Na_xWO_3$ compounds in which $x=0.83$ and 0.87 were observed to be inactive in this evaluation.

EXAMPLE III

In these examples, higher ratios of tungsten trioxide/tungsten were employed than the ratio 3.27/1 used in the preceding examples. The reactants were pelleted and heated under argon to 950° to 975° C. and were then slowly cooled to below 584° C. (solidification temperature) in approximately five hours, at which time the furnace was turned off.

(*a*) *Fusion charge.*—10 g. thallium tungstate, 2.0 g. tungstic acid, 0.32 g. tungsten powder $H_2WO_4/W=4.61$.

The resultant product was similar in appearance to the product of Example II. Several large crystals measured 2 x 4–5 mm. Analysis showed 20.54% thallium, which corresponds in composition to $Tl_{0.29}WO_3$.

(*b*) *Fusion charge.*—10 g. thallium tungstate, 2.5 g. tungstic acid, 0.23 g. tungsten powder $H_2WO_4/W=8/1$.

Smaller hexagonal blue crystals than those from Examples I and II.

(*c*) *Fusion charge.*—10 g. thallium tungstate, 3.0 g. tungstic acid, 0.14 g. tungsten powder $H_2WO_4/W=16/1$.

Obtained long blue needles (2–3 x 0.1 mm.) of irregular, rather than hexagonal cross section. X-ray diffraction powder pattern duplicated that of Example I.

In the following two examples, thallium tungstate, tungstic acid, and tungsten were reacted in supercritical water to give $Tl_xWO_3$ compounds.

EXAMPLE IV

A pelleted blend of 0.35 g. thallium tungstate, 1.60 g. tungstic acid, and 0.033 g. tungsten powder, along with 3 cc. of water, was sealed into a ⅜" I.D. platinum tube of approximately 7.5 cc. volume after sealing off. This tube was then maintained for three hours at 600° C. under an external pressure of approximately 3000 atmospheres of water vapor. A fibrous blue solid was isolated and purified by extraction with boiling 0.5 N aqueous sodium hydroxide and boiling water. Its X-ray pattern duplicated that of the product of Example I. The product analyzed 21.3% thallium, which corresponds in composition to $Tl_{0.31}WO_3$.

EXAMPLE V

In a manner similar to Example IV, 1.129 g. thallium tungstate, 0.500 g. tungstic acid, 0.105 g. tungsten powder, and 2.5 cc. of water were reacted in a sealed platinum tube for eight hours at 600° C. and 3000 atmospheres pressure. Blue needles up to 1 mm. in length were obtained. After elimination of a few unidentified lines, the X-ray diffraction pattern of this material duplicated that of the product of Example I. The product analyzed 22.8% thallium, which corresponds in composition to $Tl_{0.33}WO_3$.

EXAMPLE VI

A pelleted blend of 1.0 g. tungstic acid and 1.0 g. indium metal was heated under an oil pump vacuum in a quartz tube to 1040° C. over a 5¾ hour period and held one hour at this temperature. Heating was terminated and the product allowed to cool under vacuum.

The resultant product consisted of a mixture of blue-black crystals, white crystals, and metallic indium. The bulk of the white product was picked out by hand and discarded, and the remaining material was treated with boiling 6 N HCl to remove any $In_2O_3$ and free indium. After water-washing and air-drying, a deep purple-colored, crystalline solid remained. The X-ray diffraction pattern for this material, after elimination of weak lines corresponding to $WO_2$ and tungsten, is given in Table II. These data indicate this compound to have an hexagonal crystal structure with $a_0=7.38$ A., $c_0=7.56$ A., and space group $D_{6h}^3$. Analysis of the product gave 5.61% indium, indicating the composition to correpond to $In_{0.12}WO_3$.

Electrical characterization of a compressed pellet of this product showed it to have a room temperature resistivity of 12 ohm. cm. and a thermoelectric power of 100 microvolts/° C. This powder was also electroluminescent, showing a dull blue-green color at a threshold voltage of 650 volts.

*Table II*

| I | *d* | Miller Indices *hkl* |
|---|---|---|
| $M_3$ | 6.32 | 100 |
| $M_2$ | 3.74 | 002, 110 |
| VF | 3.31 | 111 |
| F | 3.24 | 102 |
| S | 3.21 | 200 |
| $M_3$ | 2.63 | 112 |
| $M_1$ | 2.43 | 202 |
| F | 2.301 | 211 |
| F | 2.140 | 300 |
| VF | 2.079 | 113 |
| F | 2.038 | 212 |
| $M_4$ | 1.871 | 004 |
| $M_2$ | 1.846 | 220 |
| F | 1.805 | 104 |
| F | 1.779 | 310 |
| $M_4$ | 1.729 | 311 |
| VF | 1.673 | 114 |
| $M_2$ | 1.662 | 222 |
| $M_2$ | 1.624 | 204 |
| $M_2$ | 1.604 | 312 |
| $M_3$ | 1.474 | 402 |
| F | 1.455 | 313 |
| VF | 1.414 | 304 |
| VF | 1.396 | 410 |
| F | 1.373 | 411 |
| $M_3$ | 1.318 | 224 |
| F | 1.293 | 314 |
| F | 1.254 | 006 |
| VF | 1.229 | 106 |
| $M_4$ | 1.220 | 404, 413 |

EXAMPLE VII

A pelled blend of 0.46 g. indium oxide ($In_2O_3$), 1.25 g. tungstic acid, and 0.30 g. tungsten powder along with 3.0 cc. of water was sealed into a ⅜" I.D. platinum tube of ca. 8 cc. volume after sealing off. This tube was then maintained for six hours at 576° to 605° C. under an external pressure of ca. 3000 to 3200 atmospheres of water vapor. Two crystalline-appearing products were isolated, one being a deep blue material that was agglomerated together into small lumps, and the second being a white solid. The blue, crystalline solid was not stable in the presence of dilute aqueous sodium hydroxide and hence could not be isolated from the reaction mixture by this treatment. The blue and white solids were inert to boiling nitric acid. The blue, crystalline solid was handseparated under the microscope and the X-ray diffraction pattern given in Table III was obtained. These data which duplicate those of Example VI indicate that this material is an $In_xWO_3$ compound with hexagonal crystal structure —$a_0$=7.38 A., $c_0$=7.56 A., and space group $D_{6h}^3$.

*Table III*

| I | d | Miller Indices hkl |
|---|---|---|
| $M_4$ | 6.32 | 100 |
| $M_2$ | 3.74 | 002, 110 |
| F | 3.24 | 102 |
| S | 3.206 | 200 |
| $M_4$ | 2.634 | 112 |
| $M_1$ | 2.433 | 202 |
| VF | 2.301 | 211 |
| VF | 2.140 | 300 |
| VF | 2.038 | 212 |
| $M_4$ | 1.871 | 004 |
| $M_2$ | 1.846 | 220 |
| F | 1.805 | 104 |
| VF | 1.779 | 310 |
| F | 1.729 | 311 |
| VF | 1.673 | 114 |
| $M_3$ | 1.662 | 222 |
| $M_3$ | 1.624 | 204 |
| $M_3$ | 1.604 | 312 |
| $M_4$ | 1.474 | 402 |
| F | 1.455 | 313 |
| VF | 1.414 | 304 |
| VF | 1.396 | 410 |
| VF | 1.373 | 411 |
| $M_3$ | 1.318 | 224 |
| F | 1.293 | 314 |
| $M_4$ | 1.220 | 404, 413 |

EXAMPLE VIII

A pelleted blend of 0.34 g. gallium oxide ($Ga_2O_3$), 1.34 g. tungstic acid, and 0.33 g. tungsten powder, along with 3.0 cc. of water, was sealed into a ⅜" I.D. platinum tube of ca. 8 cc. volume, after sealing off. The tube was then maintained for six hours at 576° to 605° C. under an external pressure of ca. 3000 to 3200 atmospheres of water vapor. A blue powder was obtained that was water-washed and air-dried. This material was unstable in the presence of dilute aqueous sodium hydroxide but was inert to concentrated nitric acid. Table IV gives the X-ray diffraction pattern of the product, after elimination of some lines corresponding to tungsten trioxide. Analysis of the product gave 9.75% gallium, indicating the approximate composition $Ga_{0.36}WO_3$. Electrical characterization of this product showed it to be electroluminescent, exhibiting a medium yellow green color at a threshold voltage of 120 volts.

*Table IV*

| I | d |
|---|---|
| $M_3$ | 4.60 |
| $M_2$ | 3.31 |
| $M_2$ | 3.18 |
| F | 2.910 |
| VF | 2.712 |
| S | 2.453 |
| $M_3$ | 2.302 |
| $M_3$ | 2.194 |
| $M_4$ | 2.159 |
| F | 2.097 |
| $M_4$ | 2.026 |
| F | 1.993 |
| F | 1.951 |
| $M_1$ | 1.700 |
| $M_1$ | 1.668 |
| $M_3$ | 1.601 |
| F | 1.562 |
| $M_4$ | 1.536 |
| $M_3$ | 1.476 |
| $M_3$ | 1.462 |
| $M_3$ | 1.441 |
| F | 1.393 |
| $M_2$ | 1.362 |
| $M_4$ | 1.340 |
| $M_4$ | 1.326 |
| F | 1.293 |

EXAMPLE IX

A pellet of 0.5 g. tungstic acid was placed in a quartz tube out of direct contact with 0.3 g. gallium metal. The tube was heated under vacuum for 24 hours at 300° C. in order to convert the tungstic acid into tungsten trioxide by removal of water. It was then sealed off under vacuum and maintained for 56 hours in the temperature range 750–950° C., under autogenous pressure to allow gallium vapor to diffuse into and react with the tungsten trioxide. The resultant pellet was then red-brown in color. The X-ray diffraction pattern shown in Table V was obtained on this material.

*Table V*

| I | d |
|---|---|
| $M_1$ | 3.385 |
| S | 2.433 |
| $M_3$ | 2.396 |
| F | 2.174 |
| VF | 1.975 |
| VF | 1.875 |
| VF | 1.751 |
| $M_1$ | 1.711 |
| VF | 1.687 |
| $M_3$ | 1.524 |
| VF | 1.416 |
| $M_3$ | 1.397 |
| $M_3$ | 1.310 |
| F | 1.222 |
| $M_3$ | 1.210 |
| $M_3$ | 1.198 |
| F | 1.138 |
| F | 1.087 |
| $M_3$ | 1.079 |
| $M_3$ | 1.037 |
| VF | 0.943 |
| $M_3$ | 0.917 |

Analysis gave 7.38% gallium indicating the composition $Ga_{0.27}WO_3$.

EXAMPLE X

A pelleted blend of 0.29 g. aluminum oxide trihydrate, 1.39 g. tungstic acid, and 0.34 g. tungsten powder, along with 3.0 cc. of water was sealed into a ⅜" I.D. platinum tube of ca. 8 cc. volume. The tube was maintained for six hours at 600° C. under an external pressure of 2995 atmospheres of water vapor. A deep blue, crystalline solid was isolated. This product was unstable in the presence of dilute aqueous sodium hydroxide but was inert to hot aqua regia. Table VI gives the X-ray diffraction data obtained, after elimination of some lines corresponding to tungsten trioxide. This pattern is observed to be similar to that of the product of Example VIII ($Ga_{0.36}WO_3$), except that the cell constants are smaller, reflecting the smaller size of aluminum as compared to gallium. From this, it may be inferred that its composition is also similar to that of the product of Example VIII. Electrical characterization of this product showed it to be electroluminescent, exhibiting a medium yellow-green color at a threshold voltage of 170 volts.

*Table VI*

| I | d |
|---|---|
| $M_2$ | 4.48 |
| $M_3$ | 3.26 |
| $M_3$ | 3.14 |
| $M_4$ | 2.86 |
| S | 2.427 |
| $M_4$ | 2.263 |
| $M_1$ | 2.154 |
| F | 2.125 |
| F | 2.061 |
| $M_3$ | 1.996 |
| $M_4$ | 1.786 |
| $M_1$ | 1.671 |
| $M_1$ | 1.638 |
| F | 1.579 |
| F | 1.534 |
| F | 1.518 |
| F | 1.489 |
| F | 1.454 |
| F | 1.432 |
| F | 1.420 |
| F | 1.369 |
| $M_3$ | 1.343 |
| $M_4$ | 1.313 |
| $M_4$ | 1.305 |
| F | 1.274 |

EXAMPLE XI

A pelleted blend of 0.5 g. boron oxide, 1.0 g. tungstic acid, and 0.5 g. tungsten powder was reacted in 3 g. supercritical water in a manner similar to Example IV. The resultant blue product, after extraction with boiling 1 N aqueous sodium hydroxide, was obtained as a blue solid. This material had the X-ray diffraction pattern given in Table VII. By analysis this product was shown to correspond in composition to $B_{0.20}WO_3$.

Electrical characterization of a compressed pellet of this product showed it to have a room temperature resistivity of 56 ohm. cm. and a thermoelectric power of 27 microvolts/° C. (n-type). This powder was also electroluminescent, showing a dull orange color at a threshold voltage of 400 volts.

*Table VII*

| I | *d* | I | *d* | I | *d* |
|---|---|---|---|---|---|
| F | 4.21 | $M_3$ | 2.225 | F | 1.464 |
| S | 3.75 | $M_4$ | 2.179 | $M_3$ | 1.412 |
| $M_4$ | 3.60 | $M_3$ | 1.988 | $M_4$ | 1.394 |
| $M_1$ | 3.42 | F | 1.971 | F | 1.376 |
| VF | 3.26 | $M_2$ | 1.894 | $M_4$ | 1.358 |
| F | 3.17 | F | 1.786 | F | 1.328 |
| $M_3$ | 3.02 | $M_1$ | 1.726 | F | 1.298 |
| $M_3$ | 2.910 | $M_2$ | 1.697 | $M_4$ | 1.262 |
| VF | 2.838 | $M_4$ | 1.682 | VF | 1.240 |
| $M_2$ | 2.736 | $M_2$ | 1.652 | $M_3$ | 1.224 |
| $M_2$ | 2.657 | $M_4$ | 1.630 | $M_3$ | 1.211 |
| $M_3$ | 2.513 | F | 1.601 | F | 1.185 |
| $M_1$ | 2.415 | $M_4$ | 1.581 | $M_4$ | 1.151 |
| $M_4$ | 2.307 | $M_2$ | 1.541 | | |

EXAMPLE XII

A pelleted blend of 0.2 g. of tungsten powder, 1.0 g. of tungstic acid, and 5.0 g. boron oxide (excess to act as a flux) was charged into a quartz tube, heated under vacuum for one hour to 460° C., argon was then passed continuously over the sample, and heating continued for two hours at ca. 1000° C. This temperature was maintained for ½ hour and the product was then slowly cooled to 612° C. over a three-hour period Heating was terminated and the product allowed to cool rapidly to room temperature.

The resultant plum-red solid was extracted with 1 N aqueous sodium hydroxide to remove excess boron oxide. A plum-red powder remained that had the X-ray diffraction pattern given in Table VIII.

*Table VIII*

| I | *d* | I | *d* |
|---|---|---|---|
| $M_2$ | 3.75 | F | 1.652 |
| $M_4$ | 3.60 | F | 1.630 |
| S | 3.42 | F | 1.601 |
| VF | 3.17 | $M_4$ | 1.581 |
| $M_4$ | 2.910 | $M_3$ | 1.541 |
| F | 2.736 | F | 1.464 |
| F | 2.657 | $M_4$ | 1.412 |
| F | 2.513 | $M_4$ | 1.394 |
| $M_1$ | 2.415 | VF | 1.376 |
| $M_4$ | 2.307 | F | 1.358 |
| $M_2$ | 2.225 | F | 1.328 |
| F | 1.988 | VF | 1.298 |
| F | 1.971 | F | 1.262 |
| F | 1.894 | F | 1.240 |
| $M_4$ | 1.786 | $M_4$ | 1.224 |
| $M_1$ | 1.726 | $M_4$ | 1.211 |
| $M_3$ | 1.697 | VF | 1.185 |
| F | 1.682 | F | 1.151 |

The group III–A elements are those of atomic number 5 through 81, i.e., boron, aluminum, gallium, indium, and thallium.

As previously stated, the oxides of tungsten and group III–A element of this invention correspond to $M_xWO_3$, in which $x$ varies from about 0.05 to 0.5. These oxides are useful for thermoelectric and semiconductor applications.

The development of thermoelectric materials is technologically important not only for power generation but for refrigeration. In power-generating applications, the compositions of this invention show advantages from several standpoints:

(1) They are made from abundantly available materials, (2) They do not appear susceptible to traces of impurities, and (3) They are able to operate at high temperatures.

The efficiency of power generation through the use of thermoelectric materials is determined by the Carnot cycle and by the index of efficiency of the thermoelectric material and is independent of the size of the generator. This is important in machines destined to travel in space, where heat must be dumped into space by radiation. In order to reduce weight, the radiating surface must be very hot and the heat-sink of the power generator must likewise be very hot. A thermoelectric power generator is an excellent answer to these unique requirements.

Thermoelectric refrigeration is an important field in which thermoelectric materials find applications. In these units these materials can be used in construction of small, inexpensive machines to good advantage.

The oxides of this invention are also semiconductors and are useful as electroluminophors and in crystal rectifiers, transistors, and photoconductive devices. In these applications, these compositions are superior to existing materials in not appearing to be susceptible to trace impurities and in being resistant to surface attack by moisture.

What is claimed is:

1. An oxide of the formula $M_xWO_3$ wherein M is a group III–A element of atomic number 5 through 81 and $x$ is from about 0.05 to 0.5.

2. An oxide of claim 1 wherein M is thallium.

3. An oxide of claim 1 wherein M is gallium.

4. A hydrothermal process for preparing an oxide of tungsten and a group III–A element of atomic number 5 through 81, comprising treating tungstic acid with powered tungsten and a member selected from the group consisting of oxides and tungstates of group III–A elements, in supercritical water at a temperature of from about 450° to 800° C. and at a pressure of from about 500 to 3500 atmospheres, the gram atom ratio of said group III–A element to total tungsten in the reaction mixture being in the range of from about 1:20 to 50:1.

5. The process of claim 4 wherein thallium tungstate is reacted with tungstic acid and powered tungsten.

6. The process of claim 4 wherein gallium oxide is reacted with tungstic acid and tungsten powder.

7. The process of claim 4 wherein boron oxide is reacted with tungsten powder and tungstic acid.

8. A process for preparing $In_xWO_3$, where $x$ is from about 0.05 to 0.5, comprising reducing tungstic acid with indium metal under autogenous pressure and at a temperature of about 1040° C. for from 1–96 hours.

9. A process for preparing $Ga_xWO_3$, where $x$ is from about 0.05 to 0.5, comprising reducing tungsten trioxide with gallium vapor under autogenous pressure and at a temperature of from about 750°–900° C. for from 1–96 hours.

10. A process for preparing an oxide of tungsten and a group III–A element of atomic number 5 through 81, comprising reducing tungsten trioxide with tungsten in a melt of a compound selected from the group consisting of a tungstate and an oxide of a group III–A element, in an inert atmosphere, at a temperature of from 600° to 1100° C. for from 3 to 130 hours, the gram atom ratio of group III–A element to total tungsten in the reaction mixture being in the range of from about 1:20 to 50:1, and the ratio of tungsten to tungsten oxide in the reaction mixture being in the range of from about 1:40 to 5:1.

11. The process of claim 10 wherein the group III–A compound is thallium tungstate, the temperature is from 850° to 1000° C. and the gram atom ratio of tungsten to tungsten oxide is in the range of from 1:32 to 3:1.

12. The process of claim 10 wherein the group III–A compound is boron oxide and the gram atom ratio of tungsten to tungsten oxide is in the range of from 1:32 to 3:1.

13. An oxide of the formula $Tl_xWO_3$ wherein $x$ is from 0.29 to 0.35 inclusive.

14. $B_{0.20}WO_3$.

15. An oxide of the formula $Ga_xWO_3$ wherein $x$ is from 0.27 to 0.36 inclusive.

16. $In_{0.12}WO_3$.

17. An oxide of claim 1 wherein $x$ is from 0.12 to 0.36 inclusive.

18. The process of claim 4 wherein indium oxide is reacted with tungstic acid and tungsten powder.

References Cited in the file of this patent

UNITED STATES PATENTS

| | | |
|---|---|---|
| 2,702,232 | Arnold et al. | Feb. 15, 1955 |
| 2,855,491 | Navias | Oct. 7, 1958 |